Feb. 18, 1941.  W. S. MEEKS  2,232,620
LUBRICATION SYSTEM
Filed April 18, 1938
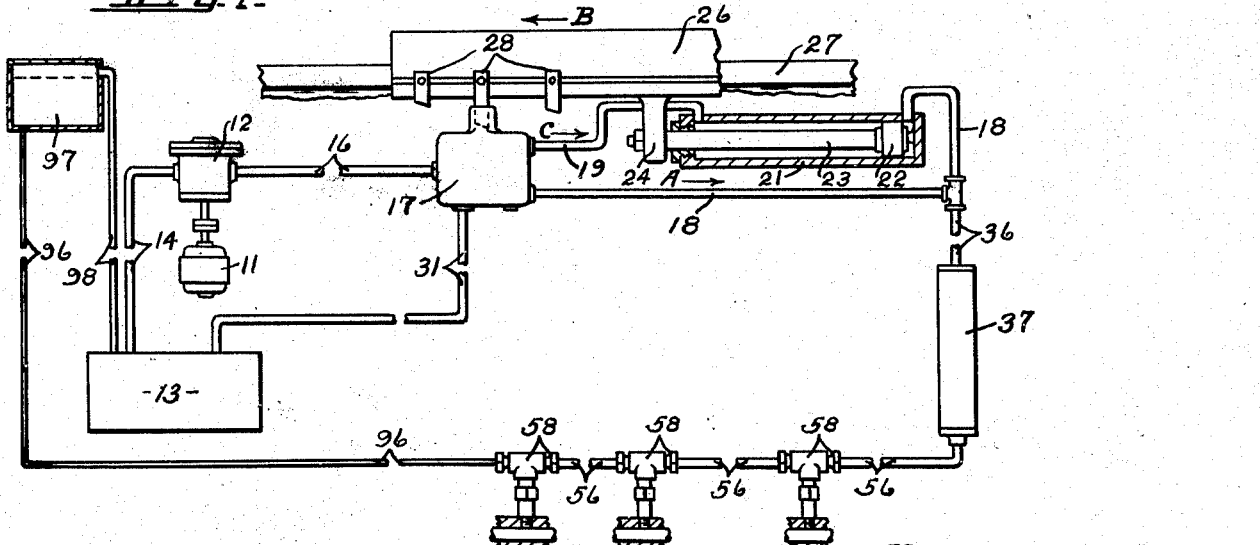
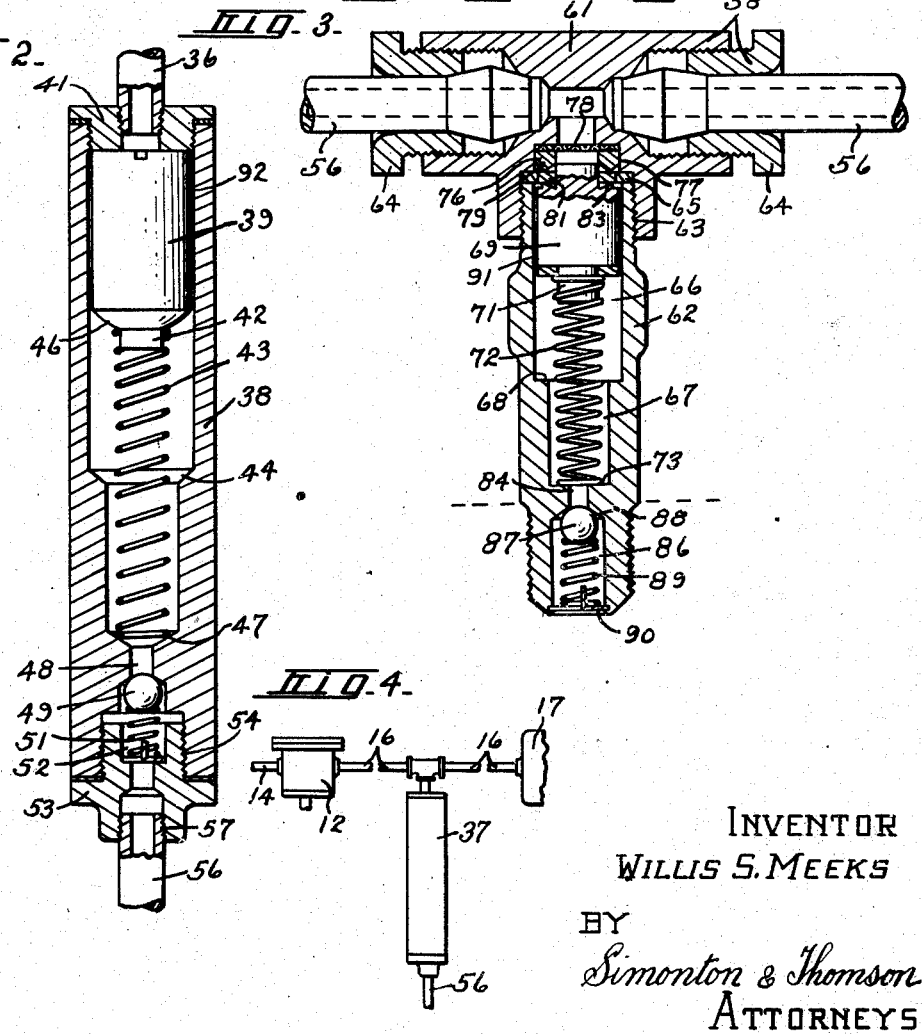
INVENTOR
WILLIS S. MEEKS
BY
Simonton & Thomson
ATTORNEYS Patented Feb. 18, 1941

2,232,620

UNITED STATES PATENT OFFICE 2,232,620

LUBRICATION SYSTEM

Willis S. Meeks, Auburn, N. Y., assignor to Bowen Products Corporation, Auburn, N. Y., a corporation of New York Application April 18, 1938, Serial No. 202,610

3 Claims. (Cl. 184—7)

My invention relates to lubrication system for machine tools and more particularly to a lubrication system adapted to be operated in conjunction with the oil hydraulic control system of a machine tool.

Machine tools such as drilling, boring, reaming, turning and milling machines are now quite commonly oil hydraulically controlled. The lubrication system for these machines is, as commercially practiced, usually separate and apart from the oil hydraulic control system. Either each bearing is separately lubricated or a separate lubrication system independent of the hydraulic control is employed.

An object of my invention is to inter-connect a lubrication system to the oil hydraulic control system of a machine tool so that the same oil, used in the hydraulic control system, may be employed for lubricating the bearings of the machine.

Another object of my invention is to provide a central lubrication system for an oil hydraulically controlled machine tool in which the lubrication system is operated by the fluid pressures existent in the control system.

A further object of my invention is to provide a lubrication system for an hydraulically controlled machine tool wherein the machine is lubricated preferably either once for each cycle of operation of the machine or once each time the machine is started.

Still another object of my invention is to provide a central lubrication system for an hydraulically controlled machine tool in which a master control valve or pump is used, actuated by the pressures existent in the hydraulic control system, and which is adapted to meter the lubricant supplied to the lubrication system.

My invention further contemplates a combined control and lubrication system for a machine tool wherein a master control valve is adapted to be actuated by the pressures of fluid in the control system to meter a definite amount of lubricant and cause it to flow to the lubrication system and wherein the lubricant supplied to each bearing is metered, the master control being actuated either each time the machine is started or stopped or once for each cycle of operation of the machine.

More specifically, my invention contemplates the combining with an oil hydraulic control system of a machine tool of a lubrication system for the machine including a master lubrication control valve or pump adapted to be actuated by fluid pressure existent in the oil hydraulic control system to cause a measured quantity of oil to flow from the hydraulic control system to the lubrication system and the provision of individual metering devices for each of the bearings to accurately meter the amount of lubricant fed to each of the bearings in accordance with the cycle of operation of the machine tool.

Other objects and advantages of my invention will become apparent from the following description when taken in connection with the accompanying drawing, in which:

Figure 1 is a schematic view showing an oil hydraulic control system for a machine tool and a central lubrication system adapted to be operated in conjunction with the oil hydraulic control system.

Figure 2 is a sectional view showing the master control valve.

Figure 3 is a sectional view showing one of the bearing metering devices.

Figure 4 is a view showing another way in which the lubrication system may be connected to the oil hydraulic control system.

In Figure 1, I have shown schematically the general lay-out of an oil hydraulic control system adapted to be used to operate and control the operations of a drilling, boring, reaming, turning or milling machine. The same general construction, with modifications known in the art, may be used for operating chucks and reversing fixtures.

In general, the oil hydraulic control system comprises a motor 11 and pump 12 directly connected thereto. The pump is preferably of the rotary type and is adapted to deliver oil from a sump 13, connected to the suction of the pump by a line 14, to a pump discharge line 16. A control valve assembly, generally indicated by the numeral 17, is arranged, as is well known in the art of oil hydraulic controls, so that the oil, by properly positioning the valves, may be directed through a line 18 or a line 19. The line 19 is connected to one end of a cylinder 21 and the line 18 to the other end of the cylinder.

A piston 22, mounted and operable in the cylinder 21, is rigidly connected to a piston rod 23. The piston rod is rigidly connected to an arm 24 depending from the carriage 26 of the machine tool. The carriage 26 may be movable either vertically or horizontally and in fact may be that of any machine tool adapted to be operated by an oil hydraulic control. The carriage is movable on ways 27 by the pressure of oil on one side or the other of the piston 22. Cams 28, during movement of the carriage, are adapted to actuate the control valves in the control valve assembly 17 in the manner well known in the art of oil hydraulic control systems. When oil at pump pressure flows through the line 18 in the direction indicated by the arrow A and into the right-hand end of the cylinder, the piston 22 is moved to the left and the carriage 26 is moved in the direction indicated by the arrow B. At the same time, the oil on the left-hand side of the piston is discharged through the line 19 and through the control valve assembly 17 and line 31 back to the sump 13.

In the direction of movement of the carriage indicated by the arrow A, the tool is being fed to the work. When the machining operation has been completed, one of the cams 28 actuates the control valves so as to cause oil from the line 16 to flow through the line 19 in the direction of the arrow C and cut off the flow of oil from the pump through the line 18. The oil under pump pressure exerts a force on the left-hand side of the piston 22 thereby returning the carriage and discharging oil from the right-hand side of the piston to the line 18 back through the control valve assembly and line 31 to the sump.

In oil hydraulic control systems of this type the oil pressure delivered by the pump may vary anywhere between three hundred and a thousand pounds per square inch, depending upon the type of machine with which the control system is to be used. Due to the fact that considerably less pressure is required to return the carriage than to feed the tool to the work usually the piston rod is relatively large in diameter so that the effective area of the piston 22 on opposite sides thereof is different. It will be appreciated that the oil in the line 18 will be at pump pressure when the piston is being moved to the left and will be at considerably less than pump pressure when the piston is moving to the right because of the difference in areas on opposite sides of the piston 22.

I have found that a central lubrication system, using the same oil as is used in the oil hydraulic control system, may be connected to the line 18 and this difference in pressures utilized to operate mechanism for supplying a measured quantity of oil to each of the bearings of the machine at each cycle of operation of the machine.

In the practice of my invention, a lubrication supply conduit 36 is connected to the line 18. In the lubrication conduit 36 there is provided a master control valve or pump 37. The master control valve, as shown in Figure 2, comprises a cylinder 38 and a piston 39 operable therein. A nut 41 is threaded into the end of the cylinder into fluid-tight engagement therewith and the lubrication supply conduit 36 is threaded into the end of the nut. The end of the piston has a reduced portion 42 adapted to receive a spring 43. The cylinder 38 is provided with a reduced portion 44 which is frusto-conical in cross section. The reduced portion 44 is adapted to receive and provide a seat for a part 46 formed on the end of the piston 39. The cylinder 38 is provided with a second reduced portion 47 in which the other end of the spring 43 is seated. A passage 48 is provided below the reduced portion 47 through which lubricant flows when the piston 39 is moved downward as viewed in the drawing.

A ball check valve 49 is normally pressed by a spring 51 to close the passage 48. The spring 51 is seated in a bore 52 provided in a nut 53 which is threaded into the cylinder, as indicated at 54. A lubrication conduit 56 is threaded into the end of the nut, as indicated at 57, and this conduit 56 leads to the bearing metering devices. Three bearing metering devices have been shown, although it will be appreciated that any desired number may be used. The bearing metering devices are generally indicated by the numeral 58.

Each of the bearing metering devices comprises a T-tube connection 61 and a cylinder 62 threaded into a bore of the T-connection, as indicated at 63. A copper gasket 65 is interposed between the threaded end of the cylinder and the end of the bore 63. A pair of nuts 64 serve to retain the ends of the lubrication conduit in assembled relationship with the T-connection. The cylinder 62 has a bore 66 and a bore 67 of reduced diameter forming an annular shoulder 68. A piston 69, having a reduced portion 71, is movable in the cylinder 62. A spring 72, seated on a shoulder 73 formed in the cylinder 62 and encircling the reduced portion 71 of the piston, normally urges the piston 69 upward, as viewed in the drawing.

An annular brass ring 76 is seated in a bore 77 of reduced diameter formed in the T-connection 61. A screen 78 is interposed between the annular brass ring 76 and the bottom of the bore. The annular brass ring has an annular knife edge 79 adapted to form a seal with a fibre gasket 81 when the piston is in its uppermost position. The upper end of the piston is provided with an annular knife edge 83 which seals against the lower side of the fibre gasket 81. The bottom of the cylinder 62 is provided with a passage 84 below which is an enlarged bore 86 for the reception of a ball check valve 87 which is normally urged into sealing engagement against a seat 88 by a spring 89 held in position by a plug 90.

The length of the stroke of the piston can be readily varied either by changing the piston or by substituting for the brass plug 76 another plug of greater thickness. The piston 69 is of slightly less diameter than the bore 66. For the purpose of clearness, considerable space has been shown, as indicated at 91, between the piston and the interior wall of the cylinder. However, it will be understood that this is merely for the purpose of illustration and that the clearance is slight, just sufficient to permit oil from the lubrication conduit 56 to by-pass the piston as the latter is moved upward when a lower oil pressure exists in the lubrication conduit 56 than the force exerted by the spring 72.

The valve 87 closes immediately upon initiation of the upward movement of the piston and prevents any lubricant or other fluid from being drawn upward into the cylinder of the metering device. As the piston 69 moves upward, actuated by the spring 72, a vacuum is created below the piston which assists in drawing the oil or lubricant in the cylinder 62 from above to below the piston downward through the annular space surrounding the piston. The seal formed by the annular knife edge 83 and the annular knife edge 79 in engagement with the fibre sealing ring 81 when the piston is at the top of its stroke and under the pressure of the spring 72, prevents leakage of lubricant by gravity from the cylinder 62 should any dirt lodge between the ball 87 and its seat 88 and prevent the ball from seating properly.

Assuming the lubrication conduit, the master control valve 37 and each of the lubricant metering devices for the bearings are filled with lubricant, when the line 18 is connected to the pump and is placed under a pressure of from three hundred to a thousand pounds per square inch, the piston 39 is moved downward into engagement with the seat 44 thereby forcing lubricant in the chamber below the piston, past the check valve 49 and through the lubrication conduit 56. The piston 39 remains on its seat 44 as long as the line 18 is under pump pressure. As soon as the line 18 is cut off from the pump through the control valve assembly 17 and lubricant at pump pressure is forced through the line 19, the pressure in line 18 drops to a point such that the spring 43 is capable of moving the piston upward, as viewed in Figure 2, against the pressure in the line 18. It will be noted that a clearance is provided around the piston 39, as indicated at 92, so that lubricant on top of the piston, aided by the vacuum created below the piston, flows downward through this annular space as the piston is moved upward under the spring pressure 43, so as to condition the master control valve for operation the next time the line 18 is placed under pump pressure.

The lubricant from the master control valve, under high pressure, flows through the lubrication conduit 56 to each of the bearing metering devices 58. The spring 89 of the check valve 87 is of sufficient strength to require a hydrostatic pressure of approximately seventy-five pounds to open it, under normal conditions, however, once having opened, due to the difference in areas between that of the passage 84 and that of the ball, it will remain open under a considerably lesser pressure of, say, approximately twenty-five pounds per square inch. When the ball 87 is pressed upward against its seat, oil pressure is exerted only on the area of the ball encircled by the end of the passage 84. When the ball 87 is unseated the oil flows through a restricted annular area between the ball and the conical seat 88. The pressure in passing the ball is thus reduced in a manner similar to the reduction of pressure in a flowing fluid passing through an orifice in a pipe. The upstream pressure acts on a larger area of the ball 87 than was exposed to such pressure when the ball was sealed against the end of passage 87, consequently, less pressure per unit area is required to hold the valve open. Further, in the metering valve shown in Figure 3, a fairly large quantity of oil is ejected at high velocity past the ball 87 and the velocity pressure head of the moving oil is exerted on the entire projected area of the ball 87. Due to the viscosity of the oil, there is also a considerable friction drag exerted on the surface of the ball 87 as the oil passes around it. A somewhat smaller pressure is required to move the piston 69 downward into engagement with its seat 68 and hold the piston in such position.

When the pressure at any particular bearing metering device reaches seventy-five pounds per square inch, the check valve 87 suddenly opens. Due to the sudden reduction of pressure under the piston 69 and due to the pressure in the lubrication conduit 56, the piston rapidly descends until it seats on the shoulder 68, thus forcing lubricant to the bearing. Since only a slight pressure is required to hold the piston against the seat, fluctuations of pressure in the lubrication conduit 56, above the limit required to hold the piston on its seat, will not effect the piston 69 so as to allow it to leave its seat. It is has been observed that in operation, the bearing metering devices operate in rotation, the metering device nearest the master control 37 operating first and the rest in rotation according to their distances from the master control 37. The rotational operation of the metering devices is inherent in a system having a bleeder tube located beyond the metering devices to be operated. As pressure is built up in the line 56 oil will start to flow through the bleeder tube 96 with a consequent pressure drop, due to fluid friction, through the line 56 toward the bleeder tube 96. Consequently, pressure necessary to operate the metering devices is first built up to the operating value at the device nearest the source of pressure. As soon as the first metering valve operates, there is a drop in pressure in the line 56 and no other valve can operate until the pressure is brought up. Thus the valves operate in rotation.

It will be appreciated that at each operation of the master control piston 39, a sufficient quantity of oil should be fed through the lubrication conduit 56 to lubricate all of the bearings. To insure lubrication of the last bearing in the line, it is necessary that the volume of lubricant below the master control piston 39 be somewhat greater than required by all the bearings in the machine. Consequently, provision must be made to drain off the excess lubricant fed to the lubrication conduit 56. This is accomplished by providing a bleeder tube 96 which is connected to the lubrication conduit at the last metering device and to the sump 13. The bleeder tube 96 must be very small in diameter so as to create a considerable resistance to the flow of lubricant to thereby insure a pressure of at least seventy-five pounds per square inch in the lubrication conduit 56 for a sufficient length of time to operate all the check valves and all the bearing metering pistons. The bleeder tube is preferably extended upward to a tank 97 from which it overflows to the sump through a line 98. This prevents seepage of air into the system. After all of the pistons 69 have seated, the excess lubricant will flow through the bleeder tube 96 back to the sump causing a drop in pressure in the lubrication conduit and permitting the check valves to close and the metering pistons to move to their uppermost position. When the piston 39 has reached its uppermost position and the bearing metering pistons have reached their uppermost position, the system is in condition to deliver lubricant to the bearings the next time the line 18 is placed under pump pressure.

In the system thus far described, I have shown and described the master control piston 39 as being operated at each cycle of operation of the machine tool. It will, of course, be appreciated that the lubrication system may operate at a different cycle than that of the machine. In Figure 4, I have shown schematically an arrangement by which the bearings of the machine are lubricated each time the machine is started. In this construction, the master control cylinder 37 is connected into the line 16 from the pump 12 so that when the pump is started, the piston 39 is forced downward to force lubricant through the lubrication conduit 56 and thence to the bearing metering devices. When the pump is stopped the pressure in the line 16 falls so that the piston 69 moves upward against the pressure of spring 72 to recondition the lubrication system for operation the next time the pump is started.

While I have shown and described the preferred embodiment of my invention and have shown the lubrication system connected to oil hydraulic control systems of a machine tool, it will be appreciated that the lubrication system may be connected with the hydraulic control system of any machine adapted to be oil hydraulically controlled. It will further be appreciated that various changes and modifications may be made in the form and relation of parts without departing from the spirit of my invention as set forth in the appended claims.

I claim:

1. The combination with an hydraulic control system for a machine tool of a lubrication system for said machine, comprising a pump, a sump from which oil is withdrawn by said pump, a cylinder having a piston operable therein, a line leading from said pump to said cylinder, said piston being connected to the tool of the machine and being adapted to feed the tool toward and away from the work, said line being under one pressure when the tool is moving in one direction and under another pressure when the tool is moving in the opposite direction, a lubrication conduit connected to said line, a metering cylinder in said conduit and a metering piston in said cylinder, said piston having a pressure side and a lubricant feed side, a plurality of metering devices adapted to measure the lubricant fed to each of the bearings of the machine, said metering piston being adapted to be actuated in said metering cylinder when the pressure of liquid in said line has reached a predetermined amount to force lubricant from the feed side of said piston to said metering devices and thence to the bearings of the machine, and a spring adapted to actuate said metering piston in the opposite direction when the pressure in said line has dropped to a point such that the spring pressure is capable of moving the piston against said pressure, means in connection with said piston for enabling the lubricant to flow from the pressure to the feed side of said piston as the spring is moving said piston back to its normal position to condition said lubrication system for delivering a lubricant to the bearing the next time the pressure in said line is built up, said metering cylinder being of a size sufficient to deliver a quantity of lubricant to the lubrication system somewhat in excess of the quantity required by the bearings of the machine, and a bleeder tube connected to said lubrication system and said sump for carrying off the excess lubricant.

2. The combination with an hydraulic control system for a machine tool of a lubrication system for said machine, comprising a pump, a sump from which oil is withdrawn by said pump, a cylinder having a piston operable therein, a line leading from said pump to said cylinder, said piston being connected to the tool of the machine and being adapted to feed the tool toward and away from the work, said line being under one pressure when the tool is moving in one direction and under another pressure when the tool is moving in the opposite direction, a lubrication conduit connected to said line, a metering cylinder in said conduit and a metering piston in said cylinder, said piston having a pressure side and a lubricant feed side, a plurality of metering devices adapted to measure the lubricant fed to each of the bearings of the machine, said metering piston being adapted to be actuated in said metering cylinder when the pressure of liquid in said line has reached a predetermined amount to force lubricant from the feed side of said piston to said metering devices and thence to the bearings of the machine, and a spring adapted to actuate said metering piston in the opposite direction when the pressure in said line has dropped to a point such that the spring pressure is capable of moving the piston against said pressure, means in connection with said piston for enabling the lubricant to flow from the pressure to the feed side of said piston as the spring is moving said piston back to its normal position to condition said lubrication system for delivering a lubricant to the bearing the next time the pressure in said line is built up, said metering cylinder being of a size sufficient to deliver a quantity of lubricant to the lubrication system somewhat in excess of the quantity required by the bearings of the machine, and a bleeder tube connected between said lubrication conduit and said sump for carrying off the excess lubricant, said bleeder tube being of sufficiently small diameter as to create a resistance sufficient to insure lubrication of all the bearings.

3. The combination with an hydraulic control system for a machine tool of a lubrication system for said machine, comprising a pump having a sump and a line leading from said pump, said line at different times during the operation of said machine being under at least two pressures, a lubrication conduit connected to said line, a master metering device in said lubrication conduit adapted to be operated by the differential in pressure in said line to at intervals during the operation of the machine deliver a measured quantity of lubricant to the lubrication system, said quantity being somewhat in excess of that required by the bearings, a plurality of metering devices for the bearings to insure that each bearing receives the correct amount of lubricant, said metering devices being actuated by the pressure of lubricant in said lubrication conduit, and a bleeder tube connected between said lubrication conduit and said sump and being adapted to conduct the excess lubricant beyond that required by the bearings back to the sump, there being sufficient resistance in said tube to insure the existence at times of sufficient pressure in said lubrication conduit to cause actuation of said metering devices.

WILLIS S. MEEKS.